United States Patent [19]
Shank

[11] 3,848,482
[45] Nov. 19, 1974

[54] DIFFERENTIAL GEARING FOR GAS TURBINE ENGINE

[75] Inventor: Wayne C. Shank, Tucson, Ariz.

[73] Assignee: Avco Corporation, Williamsport, Pa.

[22] Filed: Aug. 3, 1973

[21] Appl. No.: 385,433

[52] U.S. Cl. .................................. 74/710, 74/713
[51] Int. Cl. ........................... F16h 1/38, F16h 1/40
[58] Field of Search ............... 74/710, 713, 674, 786

[56] References Cited
UNITED STATES PATENTS

| | | | |
|---|---|---|---|
| 2,589,090 | 3/1952 | Kestell | 74/674 |
| 2,668,601 | 2/1954 | Keese | 74/713 X |
| 2,693,080 | 11/1954 | Hutchinson | 60/39.16 X |
| 2,804,748 | 9/1957 | Hutchinson | 60/39.27 |
| 2,884,808 | 5/1959 | Mueller | 74/674 |
| 2,907,229 | 10/1959 | Mueller | 74/674 |
| 3,309,871 | 3/1967 | Kelly | 74/710 X |

Primary Examiner—Samuel Scott
Assistant Examiner—Lance W. Chandler
Attorney, Agent, or Firm—Charles M. Hogan

[57] ABSTRACT

First and second opposed coaxial bevel ring gears are respectively connected to the output shaft and to a compressor of a gas turbine engine. An annular carrier connected to the turbine of the gas turbine engine surrounds the ring gears. Opposed coaxial bevel pinion gears engage the ring gears and are mounted on tubular shafts telescoped into one another. Each shaft has a balancing slug at a point beyond the center of rotation of the annular carrier so that the pinion gear assemblies are balanced independently for rotation about the rotational axis of the carrier, thus minimizing axial loads on the bearings that journal the bevel gear assemblies in the carrier.

16 Claims, 1 Drawing Figure

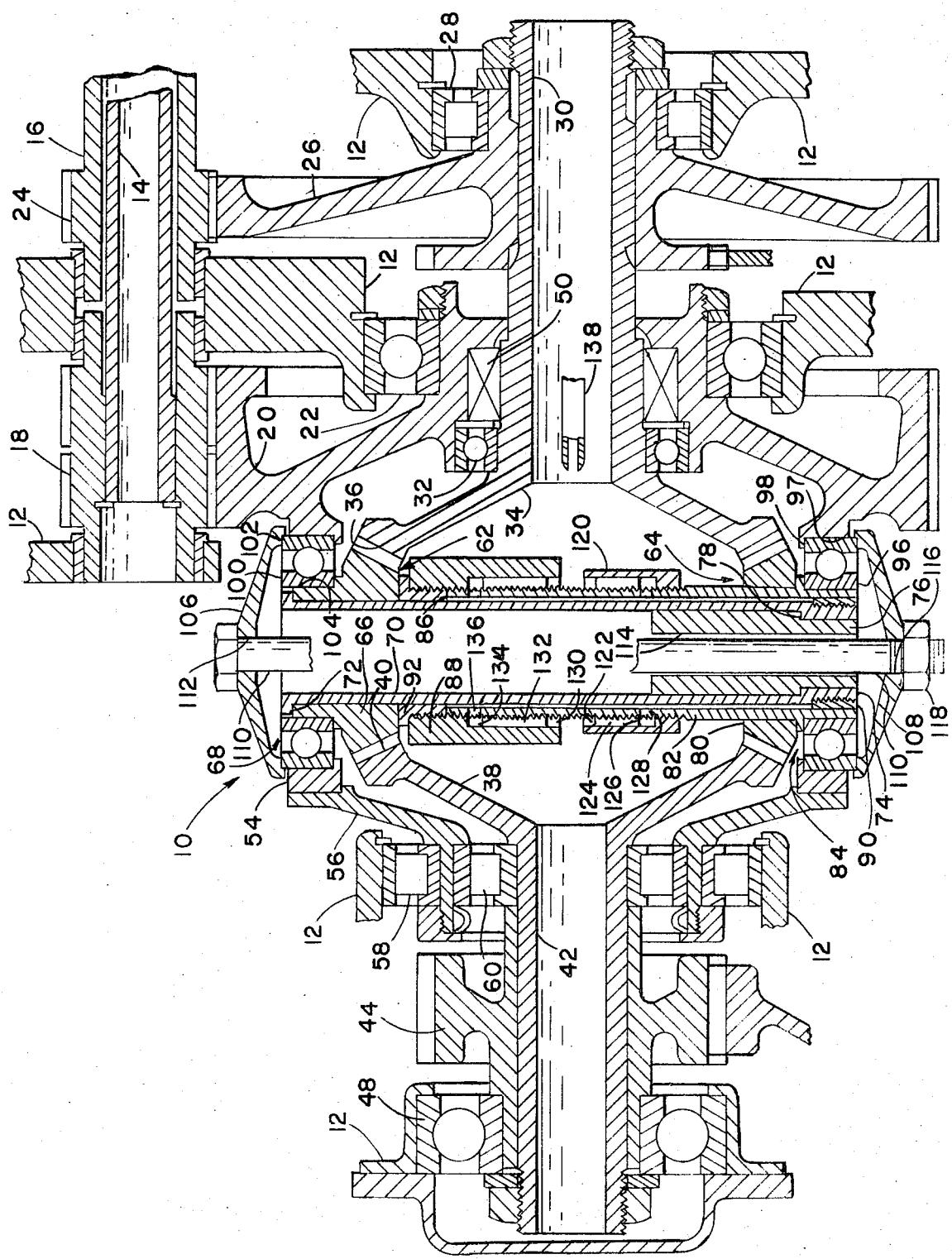

DIFFERENTIAL GEARING FOR GAS TURBINE ENGINE

In recent years the differential gas turbine engine has been proposed by D. W. Hutchinson in U.S. Pat. No. 2,693,080, entitled "Differential Gas Turbine." This type of engine eliminates the need for a separate and costly free-power turbine assembly but it introduces a rather complex differential gearing arrangement connecting the compressor, turbine and output shaft of the engine.

Another approach to the simplification of this type of differential is found in the above Hutchinson patent where bevel-type differentials are proposed, as suggested in FIGS. 7, 8 and 9. The use of the bevel differential substantially reduces the number of gears necessary for the differential unit. Recent small gas turbine engines, however, have extremely high rotational speeds for the compressor and turbine which produce correspondingly high rotational speeds in the carrier that supports the bevel planet gears in the differential. Rotational speeds on the order of 12,000 r.p.m. produce centrifugal forces along the axes of the planet gears of such magnitude that it is virtually impossible to effectively journal them for rotation relative to the carrier.

These problems are solved in accordance with the present invention by a differential gearing assembly comprising opposed coaxial bevel ring gears surrounded by a rotatable coaxial carrier. Two of these elements are connected to output shafts and one of them is connected to an input shaft. First and second bevel planet gears coaxial with one another are positioned opposite one another on the carrier and engage the ring gears. An annular element coaxial with the first planet gear extends radially inward through the axis of rotation of the carrier to a remote end adjacent the second planet gear. A balancing slug is positioned at the remote end of the annular element to balance the first planet gear about the axis of the carrier. A tubular element is coaxial with the second planet gear and is telescoped over the annular element. The tubular element extends through the axis of rotation of the carrier and terminates in a remote end adjacent the second planet gear. A balancing slug is positioned at the remote end of the tubular element to balance the second planet gear about the axis of the carrier independently of the first planet gear.

The above and other related features of the present invention will be apparent from a reading of the description of the disclosure shown in the accompanying drawing and the novelty thereof pointed out in the claims.

The single FIGURE shows a longitudinal section view of a differential gear box embodying the present invention along with cooperating components of a gas turbine engine with which it may be used.

The drawing shows a differential gear box 10 embodying the present invention. The gear box 10 is enclosed in a housing 12 which connects to the front of a gas turbine engine having an independently rotatable compressor and turbine. Only fragments of the housing 12 are shown to simplify the discussion of the present invention. In practice, the housing 12 would completely enclose the gear box 10. An example of this arrangement may be found in copending patent application Ser. No. 236,031, now U.S. Pat. No. 3,761,205 filed Mar. 20, 1972, entitled "Easily Maintainable Gas Turbine Engine," Val Cronstedt inventor, and of common assignment with the present invention. The gear box 10 has an input shaft 14 which connects to the turbine rotor of the engine in the usual fashion. A second tubular input shaft 16 is telescoped over input shaft 14 and is connected to the compressor of the gas turbine engine, also in the usual fashion.

The input shaft 14 is splined into a herringbone pinion gear 18 meshing with herringbone teeth on a bull gear 20 to maintain the input shaft 14 in a given axial position. The bull gear 20 is journaled for rotation by a bearing assembly 22 suitably mounted in housing 12. The input shaft 16 has an integral pinion gear 24 which meshes with a bull gear 26 splined over a tubular shaft 30. Gear 26 is journaled by bearing 28, mounted in housing 12 and shaft 30 is journaled relative to bull gear 20 by a bearing 32. An overrunning clutch 50 may be positioned between shaft 30 and bull gear 20 to prevent an overspeed condition as outlined in U.S. Pat. No. 2,804,748 entitled "Gas Turbine with Clutch Control," D. W. Hutchinson, inventor.

A bevel-type ring gear 34 having bevel gear teeth 36 is integral with one end of shaft 30. A second bevel-type ring gear 38 having bevel gear teeth 40 is coaxial with and faces ring gear 34. Ring gear 38 is integral with an intermediate output shaft 42 which supports a gear 44 through means of a suitable spline. Gear 44 engages a gear 46 on a final output shaft (not shown). Gear 44 is journaled at one end by means of a bearing 48 secured to housing 12.

The bull gear 20 is integral with an annular carrier 54 that is coaxial with and surrounds the ring gears 34, 38. An annular extension 56 is secured to one end of the carrier 54 and is journaled relative to the housing 12 by a bearing 58. An additional bearing 60 journals shaft 42 relative to the annular extension 56, thus providing a stable support for the ring gear 38 and gear 44. The annular carrier 54 has oppositely positioned coaxial bevel planet gear assemblies 62 and 64.

Assembly 62 comprises a bevel-type planet gear 66 engaging ring gear 38 and 34. Gear 66 is journaled for rotation by a ball bearing assembly 68 about an axis normal to the rotational axis of the annular carrier 54. Gear 66 is telescoped over an elongated tubular shaft 70 and is seated against a flange 72 of the shaft 70. Since gear 66 only transmits torque loads between gears 38 and 34, it is simply necessary to press gear 66 onto shaft 70 so that it retains axial position and centerline integrity. Tubular shaft 70 extends radially inward relative to the carrier 54 and through its axis of rotation to a remote end 74 positioned adjacent planet assembly 64. A balancing slug in the form of a sleeve 76 is received in the interior of tube 70 and is supported against a shoulder 78 by a press fit. As explained later, balancing slug 76 has a predetermined selected mass.

The second planet gear assembly 64 comprises a bevel planet gear 80 telescoped over a tubular shaft 82 with a press fit. Shaft 82 is journaled in annular carrier 54 by means of a ball bearing assembly 84. Tubular shaft 82 telescopes over shaft 70 and extends through the axis of rotation of carrier 54 to a remote end 86 positioned adjacent planet assembly 62. A balancing slug in the form of a sleeve 88 is threaded over the remote end of shaft 82. As explained later, balancing slug 88 has a predetermined mass.

A clearance is maintained between shafts 70 and 82 and the remote end 74 of shaft 70 is journaled relative to shaft 82 by a sleeve bearing 90 threaded over the remote end of shaft 70. The remote end 86 of shaft 82 is journaled over shaft 70 by sleeve bearing 92 threaded into the end of balancing slug 88 so that the sleeve bearing 92 abuts end 86 of shaft 82.

Bearing assembly 84 for planet assembly 64 comprises an inner race 96 pressed over the end of shaft 82 and an outer race 98 received in an annular recess 97 in carrier 54. Bearing assembly 68 for planet assembly 62 has an inner race 100 pressed over the end of gear 66 and an outer race 102 received in an annular recess 104 in carrier 54. The outer races 102 and 98 are held in the recesses by circular end caps 106 and 108, respectively. A through bolt 110 extends through an opening 112 in cap 106, a through bore 114 in balancing slug 76 and an opening 116 in cap 108 and receives nut 118. Thus the bolt 110 maintains the bearing assemblies 84 and 68 mounted in position on the carrier.

An annular apron 120 in the form of a sleeve is threaded over shaft 82 positioned outward from the axis of rotation of the carrier 54. Sleeve 120 has an inner open end 122 and series of axial grooves 124 leading to an annulus 126. A series of radial ports 128 extend through shaft 82 to connect the annulus 126 with the clearance between the shafts 70 and 82. A second apron is formed integral with the balancing slug 88 by an annular inwardly facing recess 130 adjacent the inwardly facing end of the slug 88. A series of axial grooves 132 on the slug 88 extend to an annulus 134. A series of ports 136 through shaft 82 connect annulus 134 to the clearance between the shafts 70 and 82.

A nozzle 138, positioned within shaft 30, receives lubricating fluid from a suitable source, such as the gas turbine engine lubrication system and it directs it along the axis of rotation of the annular carrier 54 to impinge on the surface of shaft 82 radially inward between the annular recesses 122 and 130.

During assembly of the differential gear set the planet gear assemblies 62 and 64 are balanced independently about the axis of rotation of carrier 54. This is done by first balancing gear 66, shaft 70 and balancing slug 76 in a rotatable fixture having the same geometry as that for carrier 54. The mass of slug 76 is increased by substituting a heavier slug or decreased by removing material so that the assembly is balanced for rotation about an axis (normal to the longitudinal axis of shaft 70) coinciding with the axis of rotation of carrier 54.

The assembly of gear 80, shaft 82, apron 120 and balancing slug 88 is then balanced in a rotatable fixture similar to that for assembly 72. The mass of balancing slug 88 is varied in a fashion similar to that for balancing slug 76 to balance the assembly 64 about an axis (normal to the longitudinal axis of shaft 70) coinciding with the axis of carrier 54. To fine tune the balancing of assembly 64 the apron 120 may be axially translated for a limited extent by rotating it.

In operation, the compressor and turbine shafts 16 and 14 operate at their respective r.p.m.'s and in some cases as high as 60,000 r.p.m. The simple pinion and bull gear arrangement between the shafts and the inputs to the differential enables a reasonable reduction to a rotational rate in the area of 12,000 r.p.m. As is the case with the usual differential gas turbine engine, fuel to the engine is metered so that the compressor shaft 16 is maintained at an optimum level irrespective of the r.p.m. of the output shaft. The torque supplied to the gear set by the turbine shaft equals the torque required by the compressor shaft and the output shaft so that the turbine speed is varied to maintain this relationship for varying output r.p.m.'s. When the turbine shaft 14 is operating in its rated r.p.m. the carrier 54 is spinning about its axis at approximately 12,000 r.p.m. This r.p.m. introduces a substantial outward force due to centrifugal action on each of the gears 66 and 80. However, since the gears are connected to the shafts 82 and 70, respectively, and are balanced as assemblies about the axis of rotation the outward force is at a minimum. Thus the bevel gears 80 may be effectively journaled relative to the carrier 54 with bearings having a minimum axial thrust requirement. This is a significant advantage in that it permits a more compact and economical differential gear set. This in turn significantly lowers the overall cost and weight of the engine.

The use of the annular recesses 122 and 130 to supply lubricating fluid to the shafts is inherently self-pumping, since the centrifugal force produces a radially outward flow of fluid. Thus it is only necessary to direct the fluid at the outer tubular shaft with the nozzle 138 to initiate the flow.

The above arrangement greatly simplifies the number of gears required for such an arrangement. This has a tremendous impact on the cost of the unit since each extra gear imposes not only a direct manufacturing cost but an additional assembly problem in maintaining proper clearances and insuring proper assembly. The gearing described also permits operation at extremely high r.p.m.'s which has not heretofore been possible because of the axial loads imposed on the bearings journaling the planet gears.

While the preferred embodiment of the present invention has been described, it should be apparent to those skilled in the art that it may be modified to other forms without departing from its spirit and scope.

Having thus described the invention, what is claimed as novel and desired to be secured by Letters Patent of the United States is:

1. A differential assembly for connecting a rotatable input shaft to a pair of rotatable output shafts, said differential assembly comprising:

a first bevel ring gear journaled for rotation and connected to one of said shafts;

a second bevel ring gear journaled for rotation about an axis coaxial with said first gear and connected to another of said shafts, said first and second ring gears facing one another;

an annular carrier surrounding said ring gears and journaled about an axis coaxial with said ring gears, said annular carrier being connected to the last of said shafts;

first and second coaxial planet gear assemblies rotatably journaled in opposite sides of said annular carrier about an axis normal to the axis of rotation of said carrier and engaging both of said ring gears;

said first planet gear assembly comprising a bevel gear and an elongated inner annular element extending radially inward through the axis of rotation of said annular carrier to a remote end adjacent said second planet gear assembly, and a balancing slug positioned in the remote end of said annular element, said balancing slug having a predetermined weight for balancing said first planet gear assembly about the axis of rotation of said carrier; and said second planet gear assembly comprising a bevel gear and an elongated outer tubular element slidably telescoping over said annular element and extending radially inward through the center of rotation of said carrier to a remote end adjacent said first planet gear assembly, and a balacing slug positioned at the remote end of said tubular element, said balancing slug having a predetermined mass for balancing said second planet gear assembly;

whereby the centrifugally induced forces urging said planet gear assemblies radially outward are minimized.

2. A differential assembly as in claim 1 wherein the annular element on said first planet gear assembly comprises a tube receiving said balancing slug in its inner diameter at the remote end thereof.

3. A differential assembly as in claim 1 wherein the balancing slug for said second planet assembly comprises a sleeve threaded over said tubular element.

4. A differential assembly as in claim 1 further comprising means for journaling said annular element and said tubular element relative to one another.

5. A differential assembly as in claim 4 wherein said bearings comprise:
a first sleeve bearing positioned at the end of said tubular element; and
a second sleeve bearing positioned at the end of said annular element.

6. A differential assembly as in claim 4 wherein:
said second sleeve bearing is threaded over the remote end of said annular element; and
said balancing slug for said tubular element is in the form of a sleeve threaded over the remote end of said tubular element and said second sleeve bearing is threaded into said balancing slug.

7. A differential assembly as in claim 4 further comprising means for forming annular aprons around said tubular element and having an open end facing radially inward toward the axis of rotation of said annular element whereby oil may be directed into the open end of said aprons and centrifuged outward, said tubular element having passages connecting the radially outward inner portion of said aprons to the interface between said annular and tubular elements for passage of lubricating fluid.

8. A differential assembly as in claim 7 further comprising means for directing a stream of oil against said tubular element along the axis of rotation of said carrier whereby oil is fed into the aprons.

9. A differential assembly as in claim 1 further comprising a bearing assemblies for journaling said bevel planet gear assemblies to said carrier, each of said bearing assemblies comprising an outer race mounted to said annular carrier and an inner race mounting said planet gear assemblies.

10. A differential assembly as in claim 9 further comprising:
a cap having an outer flange received over the outer race of said bearings; and
a bolt and nut assembly extending through the rotational axis of said carrier and holding said caps against said outer races whereby the outer races are secured to said carrier.

11. A differential assembly as in claim 1 in which said input shaft is a turbine shaft of a gas turbine engine, one of said output shafts is a compressor shaft for said engine and the remaining output shaft is a power output shaft for said engine and wherein said turbine shaft is connected to said annular carrier, said compressor shaft is connected to one of said ring gears and said output shaft is connected to the other of said ring gears.

12. A differential assembly as in claim 11 wherein said annular carrier is journaled over one of said ring gears and said one ring gear is connected to said compressor shaft.

13. A differential assembly as in claim 11 wherein said annular carrier has an integral driven gear with a herringbone gear pattern and said turbine shaft has an equivalent herringbone gear to the pattern for centering said turbine shaft axially relative to said gear on said carrier.

14. In a differential assembly for connecting a rotatable input shaft to a pair of rotatable output shafts, said differential assembly comprising first and second opposed coaxial bevel ring gears connected to two of said shafts, a rotatable annular carrier surrounding and coaxial with said ring gears, said carrier being connected to the last of said shafts and first and second coaxial bevel planet gears rotatably engaging said ring gears and positioned on opposite sides of said annular carrier and means for journaling said pinion gears relative to said carrier, the improvement comprising:
a first inner annular element extending from and coaxial with said first planet gear, said annular element extending radially inward through the axis of rotation of said annular carrier to a remote end adjacent said second planet gear;
a balancing slug positioned at the remote end of said annular element, said balancing slug having a predetermined weight for balancing said first planet gear about the axis of rotation of said carrier;
an outer tubular element coaxial with and extending radially inward from said second planet gear, said tubular element slidably telescoping over said annular element and extending inward through the center of rotation of air carrier to a remote end adjacent said first planet gear; and
a balancing slug positioned at the remote end of said tubular element, said balancing slug having a predetermined mass for balancing said second planet gear;
whereby the axial loads on the means journaling said pinions to said annular housing are substantially minimized.

15. Apparatus as in claim 14 wherein said annular element is tubular in form and has said balancing slug mounted in its interior diameter at the remote end thereof.

16. Apparatus as in claim 13 wherein balancing slug for said tubular element is in the form of a sleeve mounted over the remote end thereof.

* * * * *